United States Patent [19]

Ikeda et al.

[11] Patent Number: 4,567,493

[45] Date of Patent: Jan. 28, 1986

[54] LIQUID JET RECORDING HEAD

[75] Inventors: Masami Ikeda, Machida; Hiroto Matsuda, Ebina; Makoto Shibata; Hiroto Takahashi, both of Hiratsuka, all of Japan

[73] Assignee: Canon Kabushiki Kaisha, Tokyo, Japan

[21] Appl. No.: 598,974

[22] Filed: Apr. 11, 1984

[30] Foreign Application Priority Data

Apr. 20, 1983 [JP] Japan ................................ 58-69585

[51] Int. Cl.[4] ........................................ G01D 15/18
[52] U.S. Cl. ........................................ 346/140 R
[58] Field of Search ................................ 346/140 R

[56] References Cited

U.S. PATENT DOCUMENTS 4,410,899 10/1983 Haruta et al. .................. 346/140 R
4,429,321 1/1984 Matsumoto ..................... 346/140 R
4,450,457 5/1984 Miyachi et al. ................ 346/140 R

*Primary Examiner*—E. A. Goldberg
*Assistant Examiner*—Gerald E. Preston
*Attorney, Agent, or Firm*—Fitzpatrick, Cella, Harper & Scinto

[57] ABSTRACT

A liquid jet recording head comprises a liquid discharge portion including an orifice for discharging a liquid to form a flying liquid droplet and a liquid flow path communicating with the orifice having a heat applying portion to apply thermal energy to the liquid to form the liquid droplet, and an electro-thermal transducer including at least a pair of opposing electrodes electrically connected to a heat generating resistive layer formed on a base and a heat generating portion formed between the electrodes. A first upper protection layer of an inorganic insulative material and a second upper protection layer of an organic material are laminated on at least the electrodes, and the first upper protection layer and a third upper protection layer of an inorganic material different from that of the first upper protection layer are laminated in this order on at least the heat generating portion.

15 Claims, 8 Drawing Figures

LIQUID JET RECORDING HEAD

BACKGROUND OF THE INVENTION

1. Field of the Invention

This invention relates to an ink jet recording head.

2. Description of the Prior Art

An ink jet recording method (liquid jet recording method) enables high speed recording because the noise generated during recording is negligible and also enables recording on plain paper without requiring fixing or other special treatment. Accordingly, interest in this method has been increasing.

A liquid jet recording method disclosed in Japanese Patent Application Laid-Open No. 54-51837 and German Application DOLS No. 2843064 has a feature different from a conventional liquid jet recording method in that heat energy is applied to liquid to generate a motive force to jet a liquid droplet.

The method disclosed in the above patent applications is characterized in that liquid acted on by the heat energy creates a change of phase which results in a rapid increase in volume and liquid is jetted from an orifice at an end of a recording head by an action due to the change of phase so that a flying liquid droplet is formed and deposited on a record medium to form a record.

Particularly, the liquid jet recording method disclosed in the German application DOLS No. 2843064 is not only effectively applicable to a so-called drop-on demand recording method but also enables implementation of a recording head of a full line type having a high density multi-orifice head. Thus, it can provide a high resolution and high quality image at a high speed.

The recording head used in a device for the above method includes a liquid jet unit having an orifice for jetting liquid and a liquid path communicating with the orifice for forming a heat applying unit which applies heat energy to the liquid to jet a liquid droplet, and an electro-thermal transducer for generating the heat energy.

The electro-thermal transducer includes a pair of electrodes and a heat generating resistance layer connected to the electrodes for defining a heat generating region (heat generating portion) between the electrodes. The electro-thermal transducer and the electrodes are usually formed in an upper layer of a base of the liquid jet recording head. FIGS. 1A and 1B show a prior known structure of the base having the electro-thermal transducer of the liquid jet recording head formed therein.

FIG. 1A shows a plan view around the electro-thermal transducer of the base of the liquid jet recording head and FIG. 1B shows a partial sectional view taken along a dot and dash line XY in FIG. 1A.

The base 101 of the liquid jet recording head comprises a bottom layer 106, a heat generating resistance layer 107, electrodes 103 and 104, a first upper protection layer 108, a second upper protection layer 109 and a third upper protection layer 110, laminated in this sequence on a base support 105.

The heat generating resistance layer 107 and the electrodes 103 and 104 are patterned in predetermined patterns by etching. They are patterned into the same pattern in areas other than an area of an electro-thermal transducer 102, and in the area of the electro-thermal transducer 102, the electrodes are not laminated on the heat generating resistance layer 107 and the heat generating resistance layer 107 forms a heat generating portion 111. The first upper protection layer 108 and the third upper protection layer 110 are laminated on the entire surface of the base 101 but the second upper protection layer 109 is not laminated on the electro-thermal transducer 102.

Materials of the upper layers of the base are selected in accordance with characteristics such as heat resistivity, liquid resistivity, thermal conductivity and insulation required by the areas on which the upper layers are located. A primary function of the first upper protection layer 108 is to maintain an insulation between the common electrode 103 and the selection electrode 104, a primary function of the second upper protection layer 109 is to prevent penetration of the liquid and to provide the liquid resistivity, and a primary function of the third upper protection layer 110 is to provide the liquid resistivity and reinforce a mechanical strength.

In the prior art liquid jet recording head having the base constructed as described above, when the base continuously contacts the liquid for a long time during repetitive use or a long-time continuous use, the upper protection layers formed on the base are peeled off so that the insulation is deteriorated, the electrodes or the electro-thermal transducers are broken and the supply of the liquid is impeded or the jetting of the liquid is blocked by deformation of the liquid path or the orifice.

One cause for the deterioration of the long-term liquid resistivity of the prior art liquid jet recording head may be considered as follows. Since a number of fine electro-thermal transducers are simultaneously formed on the base, the surface on which the upper protection layers are to be formed has fine concavo-convex steps. Accordingly, the upper protection layers do not perfectly cover the steps or defects such as pinholes are formed in the protection layers and the liquid penetrates through the defects.

SUMMARY OF THE INVENTION

It is an object of the present invention to provide a liquid jet recording head which exhibits an excellent durability in frequently repetitive use and long time continuous use and can stably maintain a desired liquid droplet forming characteristic over an extended period.

It is another object of the present invention to provide a liquid jet recording head having a high reliability in manufacture.

According to the present invention there is provided a liquid jet recording head which comprises a liquid discharge portion including an orifice for discharging a liquid droplet to form a flying liquid droplet and a liquid flow path communicating with said orifice including a heat applying portion for applying a thermal energy to the liquid to form the liquid droplet; and an electro-thermal transducer including at least a pair of opposing electrodes electrically connected to a heat generating resistive layer formed on a base and a heat generating portion formed between said electrodes, a first upper protection layer of an inorganic insulative material and a second upper protection layer of an organic material laminated on at least said electrodes, and said first upper protection layer and a third upper protection layer of an inorganic material different from the inorganic material of the first upper protection layer laminated on at least said heat generating portion.

DESCRIPTION OF THE PREFERRED EMBODIMENTS

Figure 1A:
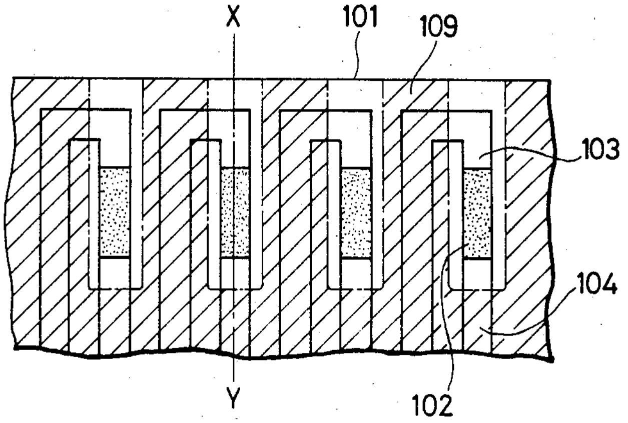
FIG. 1A shows a plan view of an electro-thermal transducer on a base of a prior art liquid jet recording head.
Figure 1B:
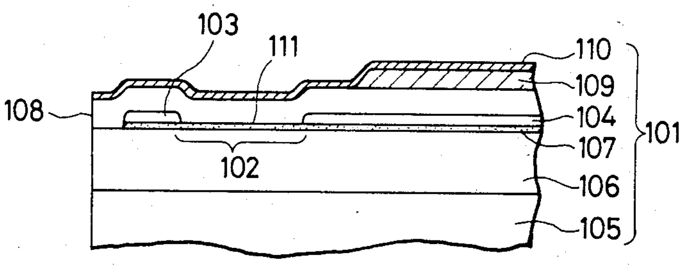
FIG. 1B shows a sectional view taken along a dot and dash line XY in FIG. 1A, FIGS. 2A, 3 and 4 show views of an electro-thermal transducer on a base of a liquid jet recording head of the present invention.
Figure 2A:
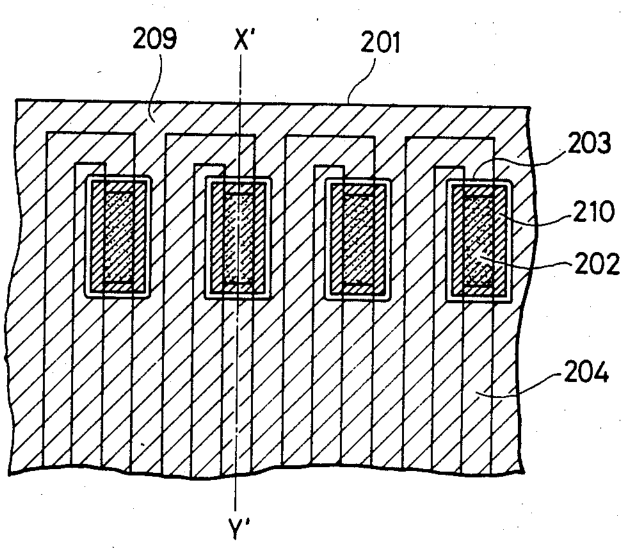
FIG. 2B shows a partial sectional view taken along a dot and dash line X'Y' in FIG. 2A.
Figure 2B:
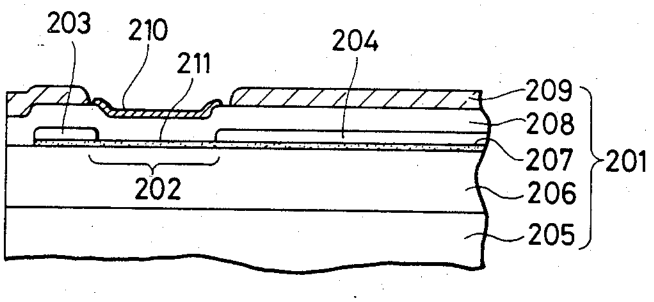

FIG. 2A shows a plan view of an electro-thermal transducer on a base of a liquid jet recording head of the present invention, and FIG. 2B shows a sectional view taken along a dot and dash line X'Y' in FIG. 2A.

A base 201 shown in FIGS. 2A and 2B comprises a base support 205 of silicon, glass or ceramics, an underlying layer 206 of $SiO_2$ formed on the base support 205, a heat generating resistive layer 207, a common electrode 204 and a selection electrode 203 laminated on the heat generating resistive layer 207 except on a heat generating portion 211, a first upper protection layer 208 which covers the heat generating portion 211, the common electrode 204 and the selection electrode 203, and a second upper protection layer 209 and a third upper protection layer 210 laminated in accordance with the structure of the underlying layer.

A heating portion 202 includes the heat generating portion 211 as a principal unit. In the heat generating portion 211, the underlying layer 206, the heat generating resistive layer 207, the first upper protection layer 208 and the third upper protection layer 210 are laminated in this sequence on the base support 205, and the third upper protection layer covers at least the surface of the heating portion 202. Thus, a dual upper protection layer comprising the first upper protection layer 208 and the third upper protection layer 210 is formed on the heating portion 202.

On the other hand, the base 201, except for the heating portion 202, is constituted of the underlying layer 206, the heat generating resistive layer 207, and the electrodes 203 and 204 which are laminated in this order on the base 205 and the first upper protection layer 208 and the second upper protection layer 209 are laminated on at least the electrodes 203 and 204.

Figure 3:
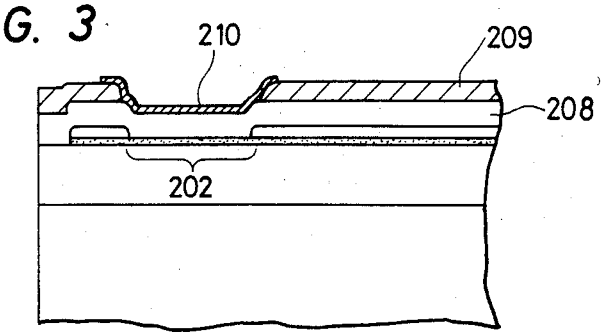
Figure 4:
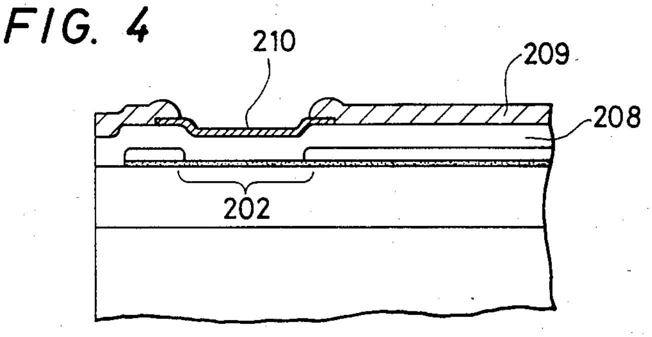

In the base 201 of the liquid jet recording head shown in FIGS. 2A and 2B, the second upper protection layer 209 and the third upper protection layer 210 are not in contact with each other. Alternatively, as shown in FIG. 3, the third upper protection layer 210 may be superimposed on the second upper protection layer 209 to cover the top of the heating portion 202 more widely, or as shown in FIG. 4, the third upper protection layer 210 may be formed between the first upper protection layer 208 and the second upper protection layer 209 to more widely cover the heating portion 202.

A principal function of the first upper protection layer 208 which is formed on at least the heating portion 202 and the electrodes 203 and 204 is to insulate the common electrode 204 from the selection electrode 203. The first upper protection layer 208 is made of an inorganic insulative material such as an inorganic oxide e.g. $SiO_2$ or an inorganic nitride e.g. $Si_3N_4$, which has relatively high thermal conductivity and heat resistivity.

The material of the first upper protection layer 208 may include, in addition to the inorganic materials described above, thin-film materials such as transition metal oxides, such as, titanium oxide, vanadium oxide, niobium oxide, molybdenum oxide, tantalum oxide, tangsten oxide, chromium oxide, zirconium oxide, hafnium oxide, lanthanium oxide, yttrim oxide, manganese oxide and the like; other metals oxides, such as aluminum oxide, calcium oxide, strontium oxide, barium oxide, silicon oxide and the like; and complex of the above metals; high dielectric nitride, such as silicon nitride, aluminum nitride, boron nitride, tantalum nitride and the like; complex of the above oxides and nitrides; semiconductive materials such as amorphous silicon, amorphous selenium and the like, which are of low resistance in a bulk state but are rendered highly resistive in a manufacturing process such as sputtering process, CVD process, vapor deposition process, vapor phase reaction process or liquid coating process. The film thickness is usually 0.1–5 $\mu m$, preferably 0.2–3 $\mu m$ and more preferably 0.5–3 $\mu m$.

The second upper protection layer 209 is formed on at least the electrodes 203 and 204 as the upper protection layer for the base 201 except on the heating portion 202, and has a region which directly contacts to the liquid. A principal function thereof is to prevent penetration of the liquid and enhance the liquid resistivity. Preferably, it has a high film-forming property, has a fine structure ans a small number on pinholes, is neither swelled with nor soluble in an ink used, has a high insulation property in a form of film and has a high heat resistance. Organic materials for the above purpose include resins, for example, silicon resin, fluorine-contained resin, aromatic polyamide, addition polymeric polyimide, polybenzimidazole, polymer of metal chelate, titanate ester, epoxy resin, phthalic resin, thermosetting phenolic resin, p-vinyl phenol resin, Zirox resin, triadine resin, BT resin (addition polymerized resin of triazine resin and bismaleimide) and the like. Alternatively, the second upper protection layer 209 may be formed by vapordepositing polyxylene resin or a derivative thereof.

Alternatively, the second upper protection layer 209 may be formed by plasma polymerizing method from various organic compound monomers such as, thiourea, thioacetamide, vinylferrocene, 1,3,5-trichlorobenzene, chlorobenzene, styrene, ferrocene, pyrroline, naphtalene, pentamethlbenzene, nitrotoluene, acrylonitrile, diphenylselenide, p-toluidine, p-xyline, N,N-dimethyl-p-toluidine, toluene, aniline, diphenylmercury, hexamethylbenzene, malonitrile, tetracyanoethylene, thiophene, benzeneselenol, tetrafluoroethylene, ethylene, N-nitrosodiphenylamine, acetylene, 1,2,4-trichlorobenzene, propane and the like.

In manufacturing a high density multi-orifice type recording head, the second upper protection layer 209 may be preferably formed by an organic material which is readily processed by fine photolithography. More preferable examples of such material include, for example, polyimidoioisoindoloquinazoline dione (trade name: PIQ available from Hitachi Kasei, Japan), polyimide resin (trade name: PYRALIN availabe from DuPont);

cyclic polybutadiene (trade name: JSR-CBR available from Japan Synthetic Rubber, Japan); photosensitive polyimide resins such as Photoneece (available from Toray, Japan), photoreactive polyamic acid for lithography (trade name: PAL available from Hitachi Kasei, Japan) and the like.

Polyimidoisoindoloquinazoline dione
(trade name: PIQ, available from Hitachi Kasei Co., Japan)

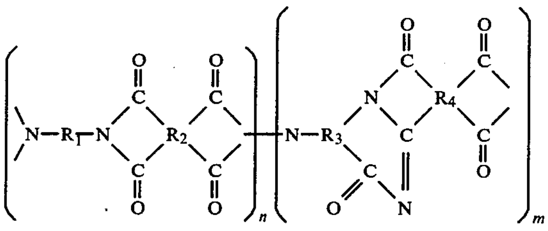

Polyimide resin
(trade name: PYRALIN, available from Du Pont, U.S.A.)

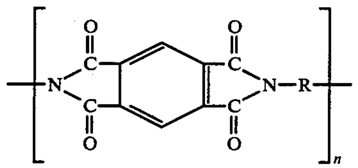

Cyclized polybutadiene
(trade name: JSR-CBR,
available from Japan Synthetic Rubber Co., Japan)
(Heat Resistive Photoresist)

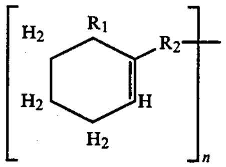

A principal function of the third upper protection layer 210 formed on the first upper protection layer 208 on the heating portion 202 is to enhance a liquid resistance and reinforce a mechanical strength. The third upper protection layer 210 is made of a metallic material which is resilient, has a relatively high mechanical strength and has contact and bonding properties to the first upper protection layer 208, such as Ta when the first upper protection layer 208 is made of $SiO_2$. By forming the third upper protection layer 210 of the inorganic material having the relatively high resilience and mechanical strength on the first upper protection layer 208 on the heating portion 202, a shock due to a cavitation action caused when the liquid is discharged from a contact plane (heat acting plane, not shown) between the heat generating portion 211 and the liquid can be fully absorbed, a probability of generation of a defect such as a pinhole formed in the upper protection layer during the manufacturing step and the deterioration of a covering property of the upper protection layer is lowered, and a lifetime of the heating portion 202 is significantly extended.

The material of the third upper protection layer 210 includes, in addition to Ta described above, an element of the group IIIa of the periodic table such as Sc or Y, an element of the group IVa such as Ti, Tr or Hf, an element of the group Va such as V or Nb, an element of the group VIa such as Cr, Mo or W, an element of the group VIII such as Fe, Co or Ni, an alloy of the above metals such as Ti-Ni, Ta-W, Ta-Mo-Ni, Ni-Cr, Fe-Co, Ti-W, Fe-Ti, Fe-Ni, Fe-Cr, Fe-Ni-Cr, a boride of the above metals such as Ti-B, Ta-B, Hf-B or W-B, a carbide of the above metals such as Ti-C, Zr-C, V-C, Ta-C, Mo-C or Ni C, and a silicide of the above metals such as Mo-Si, W-Si or Ta-Si, and a nitride of the above metals such as Ti-N, Nb-N or Ta-N. The third layer may be formed of those materials by vapor deposition process, sputtering process, CVD process or other process and the film thickness thereof is usually 0.01–5 μm, preferably 0.1–5 μm and more preferably 0.2–3 μm. The material and the film thickness are preferably selected such that a specific resistivity of the layer is larger than specific resistivities of the ink, the heat generating resistive layer and electrode layer. For example, it has a specific resistivity of 1Ωcm or less. An insulative material such as Si-C having a high anti-mechanical shock property is preferably used.

The third upper protection layer 210 may be a single layer or a composite layer of those layers. Further, the third upper protection layer 210 may be formed of a combined material which comprises the above material with those of the first upper protection layer 208.

The underlying layer 206 principally functions as a layer to control a conduction of the heat generated by the heat generating portion 211 to the support 205. The material and the film thickness of the underlying layer 206 are selected such that the heat generated by the heat generating portion 211 is more conducted to the heat applying portion (not shown) when the thermal energy is to be applied to the liquid in the heat applying portion, and the heat remaining in the heat generating portion 211 is more rapidly conducted to the support 205 when the heat conduction to the heating portion 202 is blocked. The material of the underlying layer 206 includes, in addition to $SiO_2$ described above, inorganic materials as represented by metal oxides such as zirconium oxide, tantalum oxide, magnesium oxide and aluminum oxide.

The material of the heat generating resistive layer 207 may be any material which generates a heat when energized.

Preferable exmaples of such materials are tantalum nitride, nickel-chromium alloy, silver-palladium alloy, silicon semiconductor, or metals, such as hafnium, lanthanum, zirconium, titanium, tantalum, tungsten, molybdenum, niobium, chromium, vanadium etc., alloys and borides thereof.

Of the materials of the heat generating resistive layer 207, the metal borides are particularly suitable, and of those, performance may be placed on hafnium boride for its most excellent property, and there follow zirconium boride, lanthanium boride, tantalium boride, vanadium boride and niobium boride in the order as mentioned.

The heat generating resistive layer 207 can be formed of those materials by an electron beam vapor deposition process or a sputtering process.

The film thickness of the heat generating resistive layer is determined in accordance with an area and material thereof and a shape and a size of the heat applying portion and a power consumption so that a desired heat per hour may be generated. Usually, it is 0.001–5 μm and preferably 0.01–1 μm.

The material of the electrodes 203 and 204 may be any conventional electrode material such as Al, Ag, Au, Pt or Cu. It is formed by those materials into desired size, shape and thickness at a desired position by a vapor deposition process.

The liquid jet recording head of the present invention is completed by forming a plurality of upper layers shown in FIGS. 2A to 4 on the base having the electro-thermal transducers formed thoereon, and then forming the liquid path 305 and the orifice 306 for the heat generating portion 211 formed by the electro-thermal transducers. Preferably, the third upper protection layer is formed in a minimum necessary area on the heat generating portion.

Figure 5:
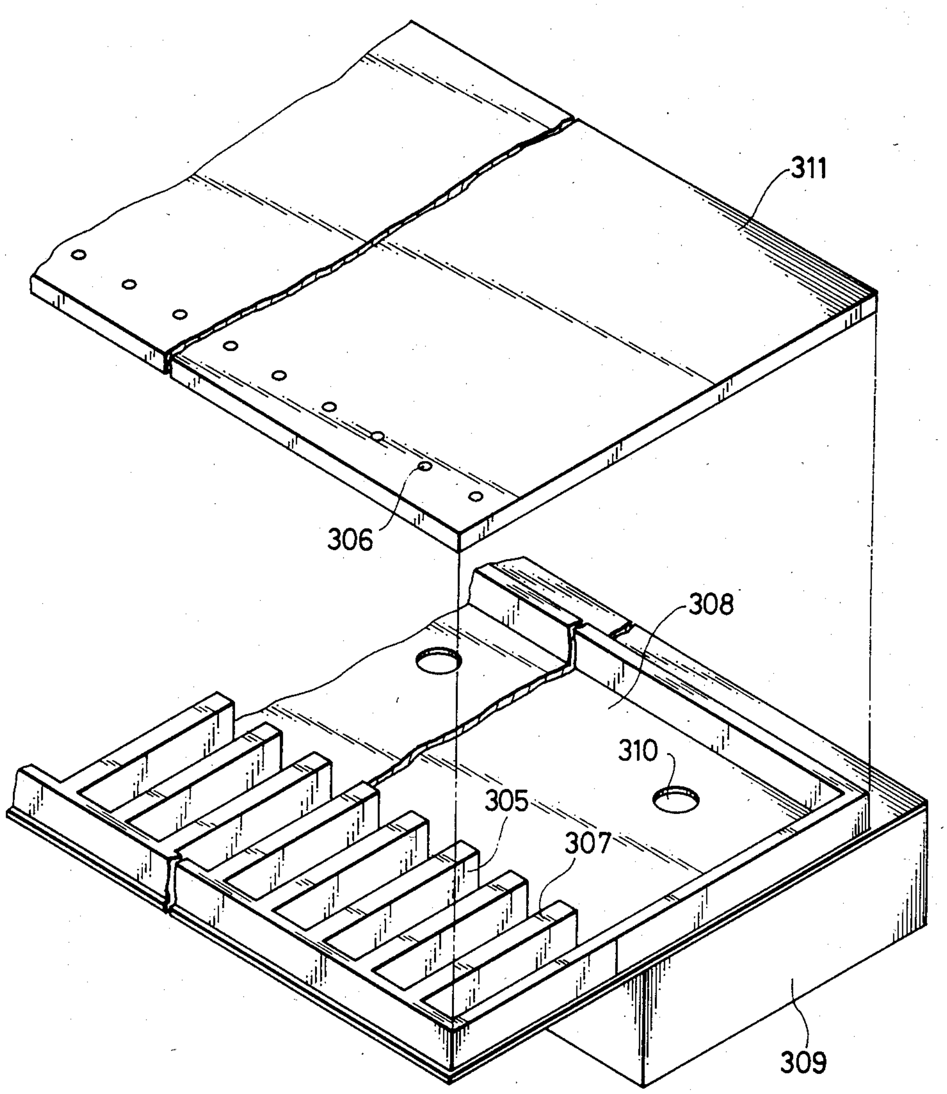
FIG. 5 shows a diagrammatic developed view of an internal structure of the liquid jet recording head of the present invention.

FIG. 5 diagrammatically shows an internal structure of the completed liquid jet recording head. In the present embodiment, the orifice 306 is above the heat generating portion. Numeral 307 denotes an ink flow path wall, numeral 308 denotes a common liquid chamber, numeral 309 denotes a second common liquid chamber, numeral 310 denotes an aperture communicating the common liquid chamber 308 to the second common liquid chamber 309, and numeral 311 denotes a upper plate. Wiring of the electro-thermal transducer is omitted in FIG. 5.

Figure 6:
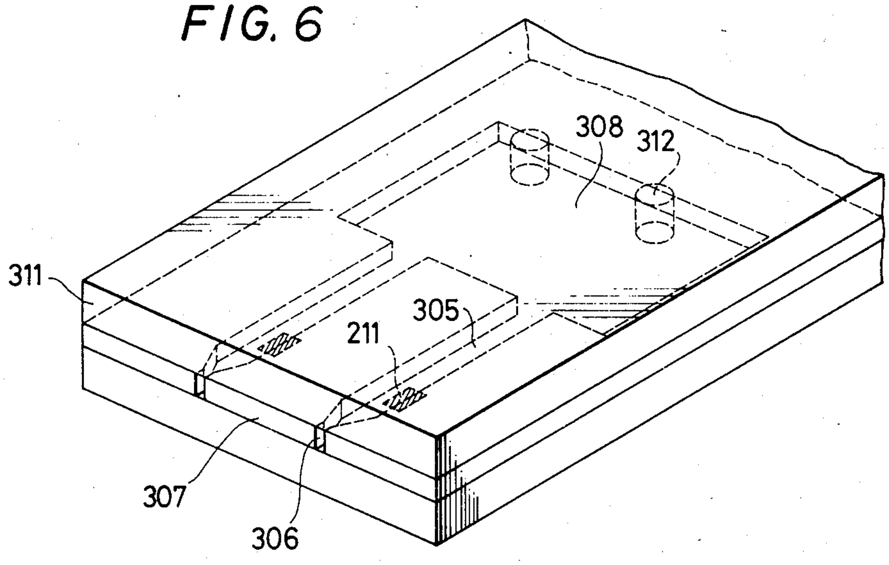
FIG. 6 shows a diagrammatic view of another embodiment of the liquid jet recording head of the present invention.

FIG. 6 diagrammatically shows another embodiment of a completed liquid jet recording head. In the present embodiment, the orifice 306 is at an end of the liquid flow path. Numeral 312 denotes an ink supply port. In the present liquid jet recording head, the upper layers on the base are made of materials properly selected in accordance with the characteristics such as heat resistance, liquid resistance, thermal conductivity and electrical insulation required by the areas on which the respective upper layers are laminated, and the upper layers of the different materials laminated on the base have good contact properties and bonding properties. Accordingly, the present liquid jet recording head exhibits high durability and liquid resistance for a frequently repetitive use and a long-term continuous use and stably maintains a desired liquid droplet formation property over an extended period.

The present invention is explained in further detail with reference to a specific example.

EXAMPLE

An Si wafer was thermally oxidized to form an $SiO_2$ film having a thickness of 5 $\mu m$ for use as the base. The base was sputtered to form a $HfB_2$ layer having a thickness of 3000 Å to form the heat generating resistive layer, and then a Ti layer of 50 Å and an Al layer of 1000 Å were sequentially formed thereof by a beam vapor deposition process. The electrodes and the heat generating resistive layer were patterned into the shape shown in FIG. 2A by a photo-lithographic process and a predetermined number of electro-thermal transducers (heat generating portion of 50 $\mu m$ with and 150 $\mu m$ length) were formed in the specific position.

An $SiO_2$ sputtering layer was deposited to a thickness of 2.8 $\mu m$ by a high rate sputtering process on the base having the electro-thermal transducers and the electrodes formed thereon, and a Ta sputtering layer was deposited to a thickness of 0.5 $\mu m$.

The sputtered Ta layer was etched by the photo-lithographic process so as that it might be left only on the electro-thermal transducers in a pattern of 90 $\mu m$ width and 200 $\mu m$ length, and the area other than the pattern on the electro-thermal transducers might be covered with Photoneece (Toray, Japan).

A photosensitive resin dry film of 50 $\mu m$ thickness was laminated on the base and it was exposed through a predetermined pattern mask and developed to form the liquid flow path and the common liquid chambers, and the glass top plate was adhesively laminated with epoxy bonding material to form the liquid jet recording head shown in FIG. 5.

The liquid jet recording head was operated for 20 days at a rate of $5\times10^7$ times a day for a durability test. In the durability test of the present liquid jet recording head, a durability of $10^9$ times was stably attained, and in a liquid resistive test of the recording head in which the recording head was immersed in the recording liquid for one month at 60° C. and subsequently utilized in an usual recording operation, no abnormal condition was observed in the top layers on the base of the recording head, no break in the wire of the head was observed and the same recording characteristic as that prior to the immersion test was maintained and an excellent overall durability was attained.

With a liquid jet recording head manufactured in the same manner as the present embodiment but having a base of a prior art structure, a durability of more than $10^7$ times was not attained in the continuous use test, and in the anti-liquid test, the upper layers on the base were peeled off the base, the liquid flow path or the orifice was deformed, and the electrodes were dissolved and the wire was broken during the use of the head under the application of a voltage to the head.

What is claimed is:

1. A liquid jet recording head comprising:

a liquid discharge portion including an orifice for discharging a liquid to form a flying liquid droplet and a liquid flow path communicating with said orifice including a heat applying portion for applying thermal energy to the liquid to form the liquid droplet;

an electro-thermal transducer including at least a pair of opposing electrodes electrically connected to a heat generating resistive layer formed on a base and a heat generating portion formed between said electrodes;

a first upper protection layer of an inorganic insulative material and a second upper protection layer of an organic material overlying at least a portion of said first upper protection layer, said layer being provided on at least said electrodes; and said first upper protection layer and a third upper protection layer of an inorganic material different from the inorganic material of said first upper protection layer provided on at least said heat generating portion.

2. A liquid jet recording head according to claim 1 wherein the first upper protection layer comprises inorganic oxides or inorganic nitrides.

3. A liquid jet recording head according to claim 1 wherein the second upper protection layer comprises an organic material selected from the group consisting of silicon resin, fluorine-contained resin, aromatic polyamide, addition polymeric polyimide, polybenzimidazole, polymer of metal chelate, titanate ester, epoxy resin, phthalic resin, thermosetting phonolic resin, p-vinylphenol resin, Zirox resin, triazine resin, BT resin, polyxylene resin and derivative of polyxylene resin.

4. A liquid jet recording head according to claim 1 wherein the second upper protection layer comprises a layer formed by a plasma polymerizing method from organic compound monomer.

5. A liquid jet recording head according to claim 1 wherein the second upper protection layer comprises an organic material selected from the group consisting of photosensitive polyimide resin, cyclic polybutadiene, polyimide resin, polyimidoisoindoloquinazoline dione.

6. A liquid jet recording head according to claim 1 wherein the third upper protection layer comprises a metal or a compound thereof selected from the group consisting of groups IIIa, IVa, Va, VIa, and VIII of the periodic table.

7. A liquid jet recording head according to claim 1 wherein the third upper protection layer comprises an alloy of the metals selected from the group consisting of groups IIIa, IVa, Va, VIa and VIII of the periodic table.

8. A liquid jet recording head according to claim 1 wherein the third upper protection layer comprises a boride of metals selected from the group consisting of groups IIIa, IVa, Va, VIa and VIII of the periodic table.

9. A liquid jet recording head according to claim 1 wherein the third upper protection layer comprises a carbide of metals selected from the group consisting of groups IIIa, IVa, Va, VIa and VIII of the periodic table.

10. A liquid jet recording head according to claim 1 wherein the third upper protection layer comprises a silicide of metals selected from the group consisting of groups IIIa, IVa, Va, VIa and VIII of the periodic table.

11. A liquid jet recording head according to claim 1 wherein the third upper protection layer comprises a nitride of metals selected from the group consisting of groups IIIa, IVa, Ia, VIa and VIII of the periodic table.

12. A liquid jet recording head according to claim 1 wherein the third upper protection layer comprises (i) a metal or a compound thereof selected from the group consisting of groups IIIa, IVa, Va, VIa and VIII of the periodic table, and (ii) inorganic oxides or nitrides.

13. A liquid jet recording head according to claim 1 wherein the third upper protection layer comprises a composite layer.

14. A liquid jet recording head according to claim 1, wherein the third upper protection layer extends over at least part of the second layer.

15. A liquid jet recording head according to claim 1, wherein the third upper protection layer extends over at least part of the first layer.

* * * * *